UNITED STATES PATENT OFFICE.

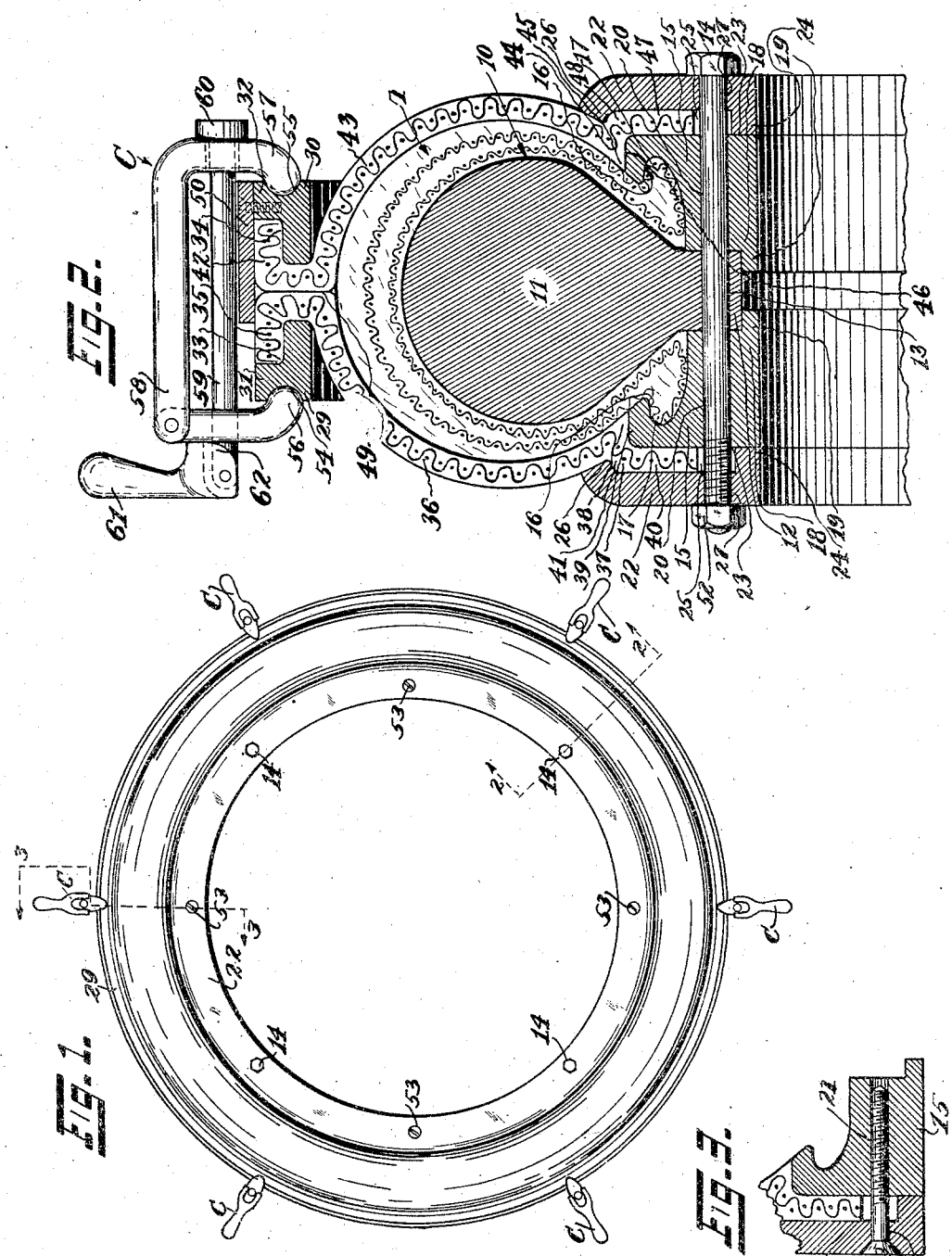

WILLIAM A. ROBBINS, OF GLEN RIDGE, NEW JERSEY.

TIRE-MOLD.

1,184,774.  Specification of Letters Patent.  Patented May 30, 1916.

Application filed January 23, 1915. Serial No. 3,853.

*To all whom it may concern:*

Be it known that I, WILLIAM A. ROBBINS, a citizen of the United States, residing in Glen Ridge, in the county of Essex and State of New Jersey, have invented certain new and useful Improvements in Tire-Molds, of which the following is a specification.

This invention relates to the general art of vulcanizing tires.

The main object of this invention is to provide a mold for tires to be vulcanized which will possess the advantages obtained by the well known wrapping method used in the vulcanization of tires, and by means of which new mold, the tire can be quickly and readily secured in place, in the mold, and not entail the laborious task which is necessary with the old wrapping method. To this end, a mold is provided comprising a core on which the tire is positioned, two complemental fabric diaphragm members disposed on each side of the outer portion of the tire, two annular metal members securing between them the two outer ends of the fabric at the tread portion of the tire, and annular members securing the inner ends of the fabric at the clencher edges of the tire, such annular members holding said fabric under tension about the outer sides of the tire, and which mold is intended to be disposed in a vulcanizer containing either steam under pressure or hot water under pressure where the vulcanizing process ensues.

Other objects of the invention are to provide a tire mold containing few parts, that can quickly and readily be assembled and can be manufactured at low cost.

These and other features, capabilities and advantages of the invention will appear from the subjoined detailed description of one specific embodiment thereof illustrated in the accompanying drawings in which—

Figure 1 is an elevation of the mold complete. Fig. 2 is a cross section on the line 2—2 of Fig. 1. Fig. 3 is a fragmental view in cross section on the line 3—3 of Fig. 1.

In the embodiment illustrated, an annular core member 10 is provided having a head portion 11 conforming to the inner periphery of the tire T to be vulcanized, and a neck portion 12 extending inwardly from said head, in which neck portion 12, there are formed bolt openings 13 suitably spaced from one another to receive the bolts 14 hereinafter to be described.

For the convenience of description, those portions of the mold and tire which face the imaginary axial line of the complete mold will be designated as the inner lateral sides, and those portions which face away from such imaginary axial line in a lateral direction as the outer lateral sides, while those portions which are disposed on and face the right hand side of Fig. 2, will be designated as the right sides and those portions which are disposed on and face the left hand side of Fig. 2 will be designated as the left sides, and those portions approaching or facing the imaginary line dividing the right from the left side of the mold, will be called the "inner circumferential" portions or faces respectively, and those portions remote from or facing away from such imaginary line will be called the "outer circumferential" portions or faces respectively.

On each side of the neck portion 12, there is provided an annular bead clamping member 15 having an inner surface 16 conforming to the bead 17 of the tire T, an extension 18 disposed to rest against the neck portion 12 of the core 10 and an annular shoulder 19 on the inner edge of such extension 18. The free edges of the extensions 18 abut against the lateral faces of the neck portion 12 while the annular shoulder portions 19 engage the inner face of such neck portion 12. The other side of each of such annular members 15 is substantially plane. Through such annular members at various points along the same, there are provided certain bolt openings 20 (Fig. 2) which pass entirely through the extensions 18, and screw openings 31 (Fig. 3).

On the right side of the right annular member 15 and on the left side of the left annular member 15, there are disposed outer longitudinal annular members 22 each adjacent to one of the substantially plane sides 23 of such annular members 15. Each of such annular members 22 has at its inner lateral end an annular flange 24 to rest against the inner end of the substantially plane side 23 of its adjacent annular member 15 forming an annular space 25 between the lateral outwardly extending portion of such annular member 22 and the annular member 15. The outer lateral annular edge of each annular member 22 extends outwardly beyond the outer lateral edge of its adjacent annular member 15 and is bent in the same direction as its flange 24 to form a circumferential inwardly curved flange 26.

Outwardly of the flange 24, and in alinement with the bolt openings in 22, there are provided bolt openings 27 (Fig. 2) in each annular member 22, and in alinement with the screw openings 21 and outwardly in a lateral direction of the flange 24, there are provided screw openings 28 (Fig. 3) in each annular member 22.

Disposed adjacent to the tread portion of the tire T, there are provided two complemental annular members 29 and 30 having annular ribs 31 and 32 respectively extending outwardly in a lateral direction therefrom, the rib 31 being disposed adjacent to the left side of the annular member 29, and the rib 32 being disposed adjacent to the right side of the annular member 30.

When the annular members 29 and 30 are in mold forming position, the outer longitudinal annular rabbets 33 and 34 of the annular members 29 and 30 respectively formed by the ribs 31 and 32 face one another and together form a chamber.

In the use of the device, there are two distinct parts of the mold, namely, the core 10 on which the tire T is built-up, and a covering member is composed of any suitable flexible material such as canvas, rubberized cloth or the like to be drawn up over such built-up tire. The covering member comprises two complemental portions, one embracing the outer lateral annular member 29, in the rabbet 33 of which the hook portion 35 of a diaphragm member 36 is disposed, which diaphragm member covers one-half of the built-up tire and has an inner lateral annular portion 37 with an inner portion 38, disposed in the corner formed between the tire T and the outer side 39 of the annular member 15, resting on such side 39, and has extending therefrom another portion 40 which is first bent around at 41 and then extends in to be secured between the left annular member 22 and the left annular member 15. Similarly, the other complemental portion embraces the outer annular member 30 in the outer annular rabbet 34 of which the hook portion 42 of the diaphragm member engages, and which diaphragm member covers the other half of the built-up tire and has an inner lateral annular portion 44 with an inner portion 45 which is disposed in the corner formed between the tire T and the outer lateral side 46 of the inner annular member 15, resting on such side 46, and has extending therefrom another portion 47 which is first bent around at 48 and then extends in to be secured between the right outer annular member 22 and the right inner annular member 15.

The opposing faces 49 of the hook portions 35 and 42 rest against one another when in mold forming position. Positioned along the outer surfaces of the hook portion 42 and part of the hook portion 35, and across the meeting edge of the two hook portions, there is provided an annular plate 50 which is secured to the rib 32 of the annular member 30.

For clamping the complemental portions together, there are provided long bolts 14 which pass through the bolt openings 27 in one annular member 22, through the bolt openings 20 in its adjacent inner annular member 15, then through the bolt openings 13 in the neck portion 12, then through the bolt openings 20 in the other longitudinal inner annular member 15, and through the bolt openings 27 in the other adjacent annular member 22, which bolts are secured on the outside by suitable nuts 52.

As additional clamping means, screws 53 are passed through the openings 28 in each outer annular member 22 and are threaded into the screw openings 21 in its adjacent inner annular member 15, whereby each complemental diaphragm portion may be secured between two inner lateral annular members independently of the other complemental diaphragm portion.

For clamping the two outer lateral annular members 29 and 30 securely against the hook portions 35 and 42, there is provided a plurality of recesses 54 in the annular member 29 in alinement with a plurality of recesses 55 in the annular member 30, which recesses are disposed along the outer longitudinal faces respectively of the annular members 29 and 30 in which alined recesses, the fingers 56 and 57 of the clamps C engage. Each clamp has a finger 56 and a finger 57, such finger 56 being pivotally connected to the longitudinally extending portion 58 of the finger 57. There are provided orifices in the fingers 56 and 57 which are in alinement with one another when the fingers are in clamping position, through which orifices passes a clamping rod 59 having a head 60 disposed on the outer longitudinal side of the finger 57 and being pivotally connected to the cam lever 61 on the outer longitudinal side of the other finger 56, which lever 61 has a cam 62 disposed to engage the outer longitudinal face of the finger 56 and to press the finger 56 toward the finger 57 into clamping position when the lever 61 is swung into position. There are provided a plurality of these clamps C positioned all along the periphery of the mold as shown in Fig. 1.

It is obvious that various changes and modifications may be made to the details of construction without departing from the general spirit of the invention.

I claim:

1. A mold for tires to be vulcanized comprising a core on which the tire to be treated is positioned, two complemental diaphragm members positioned around said tire, clamping means clamping the outer adjacent edges of said diaphragms together at the tread portion of said tire, said outer clamping means comprising two complemental annular members each having an annular rib and a rabbet adjacent thereto which annular rabbets face one another when the outer clamping means is in clamping position, an annular plate at the outer peripheries of said annular ribs and extending from one rib to the other, the outer adjacent edges of said diaphragms being disposed in said rabbets underneath said annular plate, and inner clamping means clamping the inner edges of said diaphragms in position at the clencher edges of said tire, said clamping means being removed from the main body of the diaphragm means to permit the ready access of the vulcanizing material to said diaphragm means and prevent the condensation of the same before it reaches such diaphragm means.

2. A mold for tires to be vulcanized comprising an annular core member having a neck portion, and a head on which the tire to be treated is positioned, diaphragm means positioned around said tire, clamping means clamping the free edges of said diaphragm means in position at the clencher edges of said tire, said clamping means comprising inner annular members disposed adjacent to the neck of said core member, outer annular members, between which inner and outer annular members the free edges of said diaphragm means are secured, and binding screws passing through said inner and outer annular members and said neck portion to draw said clamping means together adjacent to said neck portion and thereby draw said diaphragm means tautly around the tire to be treated.

3. A mold for tires to be vulcanized comprising a core on which the tire to be treated is positioned, diaphragm means positioned around said tire, clamping means clamping the outer free edges of said diaphragm means in position at the tread portion of said tire, said clamping means comprising two outer lateral annular members between which the free edges of said diaphragm means are disposed, clamps clamping said outer lateral members together, there being recesses in the lateral outer faces of said outer annular members, said clamps comprising fingers which engage in said recesses, one of said fingers having a longitudinally extending portion to which the other finger is pivotally connected, there being orifices through said fingers in alinement with one another when the fingers are in clamping position, a clamping rod passing through said orifices, and a cam lever pivotally connected to one end of said clamping rod and disposed for clamping said fingers together when swung into position.

4. A mold for tires to be vulcanized comprising two distinct members consisting of a core member having a neck portion, and a head on which the tire to be treated is built-up, and a covering member comprising two complemental portions, each embracing a diaphragm member to be positioned around part of said tire, outer lateral annular members for clamping the outer lateral free edges of said diaphragm together, annular ribs adjacent to the outer circumferential edges of said lateral annular members along the outer lateral faces thereof, hook portions on the outer edges of said diaphragm members disposed on the outer lateral faces of said outer lateral annular members longitudinally inward of said ribs, and an annular plate secured to one of said ribs and extending over the meeting edges of said hook portions.

WILLIAM A. ROBBINS.

Witnesses:
GUSTAV DREWS,
H. D. PENNEY.